B. TOWN.
DEVICES FOR BRACING CULTIVATOR-TEETH.

No. 193,735. Patented July 31, 1877.

Witnesses
J A Tauberschmidt
Wm H Bates

Inventor
Byron Town
by DeWitt C. Allen,
atty.

UNITED STATES PATENT OFFICE.

BYRON TOWN, OF FOND DU LAC, WISCONSIN.

IMPROVEMENT IN DEVICES FOR BRACING CULTIVATOR-TEETH.

Specification forming part of Letters Patent No. 193,735, dated July 31, 1877; application filed July 2, 1877.

*To all whom it may concern:*

Be it known that I, BYRON TOWN, of Fond du Lac, in the county of Fond du Lac and State of Wisconsin, have invented certain new and useful Improvements in Devices for Bracing Cultivator-Teeth; and I do hereby declare that the following is a full, clear, and exact description of the same, reference being made to the accompanying drawings, forming a part of this specification, and in which—

Figure 1:
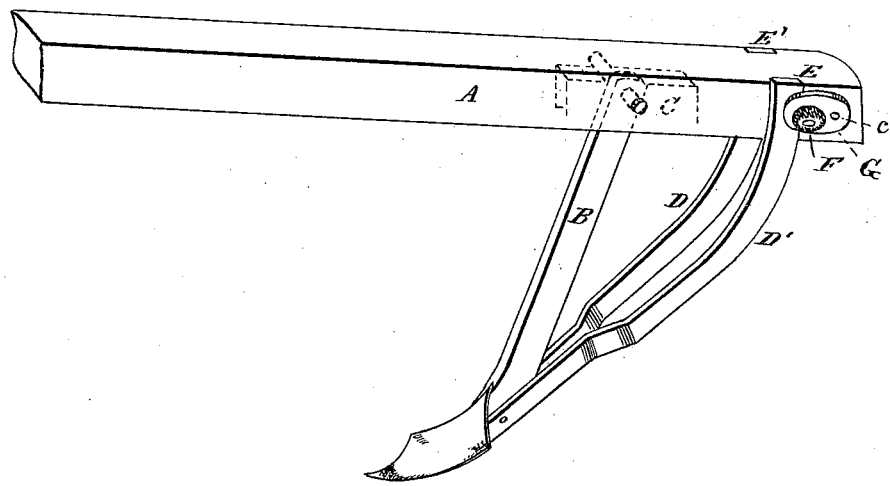
Figure 2:
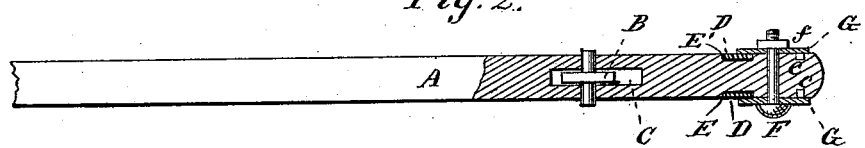
Figure 3:
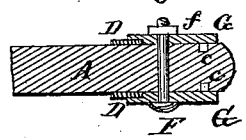

Figure 1 is a perspective view. Fig. 2 is a horizontal section; and Fig. 3 is a horizontal section of a modification of my invention.

This invention relates to improvements in devices for bracing and securing a cultivator-tooth in any desired position, and allowing it to give way or yield to any immovable obstacles without breaking; and the invention consists in the combination, with a pivoted cultivator-tooth and the beam to which it is pivoted, of a double brace clamped to both sides of the beam by means of a bolt and nut, and washers arranged upon each side of the beam and outside of the braces, for securing the tooth at any desired angle, all as hereinafter fully described.

A in the drawing, represents the beam of a cultivator, and B the tooth pivoted in the mortise C of the beam in the usual manner.

D and D' are two braces, secured at their lower ends to the opposite sides of the shank or standard of the tooth. Said braces are formed in a true circle from their upper ends nearly to the point of their shoulders, where they converge, the center of the arc being at the point where the shank or standard of the tooth is pivoted to the beam. These braces move up and down in the encircling grooves E E' on each side of the beam, and they are held in position at any desired angle by means of a clamping-bolt, F, which passes through the beam, and washers G, one on each side of the beam and outside of the braces.

By tightening the nut $f$ of the bolt the tooth can be held at any point desired, as the washers are clamped to the outside of the beam and braces, thereby forming a friction-clutch for the braces, which allow the tooth to give way or yield to any immovable obstacles without breaking.

This construction braces the tooth sidewise as well as rearwardly, which makes it much stronger than a single-brace tooth.

The washers are provided on their inner side with a lug or pin, $c$, which enters into the wood of the beam, thereby preventing the washers from turning when the braces move up and down.

I do not desire to limit myself to the grooves formed in the beam, as they may be formed on the inside of the washers, as shown in Fig. 3, and accomplish the same purpose.

The above-described construction and arrangement of devices are very cheaply applied, simple in their construction, and make a very strong and durable tooth, and the beam is also much stronger than if slotted, as is the case with the single-braced tooth.

I claim as my invention—

1. The combination, with the beam A and pivoted cultivator-tooth B, of the double brace D D', bolt and nut F $f$, and washers G G, arranged upon opposite sides of the beam A and outside of the braces, substantially as and for the purpose specified.

2. The combination of the beam A, having the encircling grooves E E', washers G G, having the lugs or pins $c\ c$, bolt and nut F $f$, double brace D D', and pivoted cultivator-tooth B, the several parts constructed and relatively arranged substantially as herein shown and described.

BYRON TOWN.

Witnesses:
C. M. TOWN,
N. C. GIFFIN.